April 6, 1943.    G. L. TAWNEY    2,315,671
SENSITIVITY OF THE PIRANI GAUGE
Filed Nov. 28, 1940
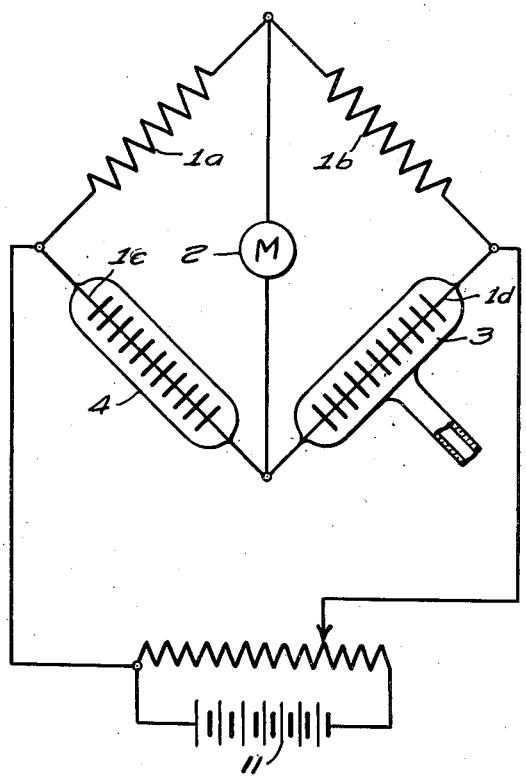
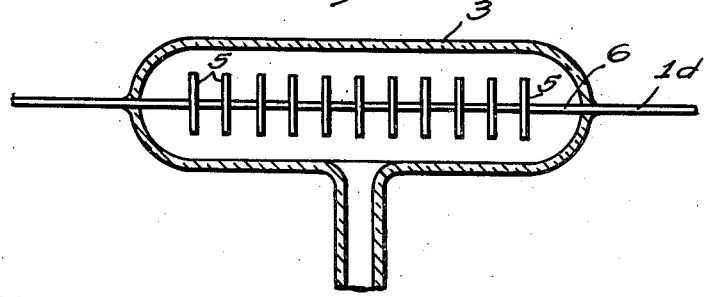
WITNESSES:
E. A. McCloskey.
Wm. C. Groove
INVENTOR
Gereld L. Tawney.
BY
S. A. Shufflett
ATTORNEY Patented Apr. 6, 1943

2,315,671

UNITED STATES PATENT OFFICE 2,315,671

SENSITIVITY OF THE PIRANI GAUGE

Gereld L. Tawney, Pittsburgh, Pa., assignor to Westinghouse Electric & Manufacturing Company, East Pittsburgh, Pa., a corporation of Pennsylvania Application November 28, 1940, Serial No. 367,626

3 Claims. (Cl. 201—63)

My invention relates to a pressure gauge and particularly to a heater element for a hot wire pressure gauge.

The lack of sensitivity has long hampered the use of hot wire gauges such as a Pirani gauge in measuring pressure variations in commercial devices of the low pressure or vacuum type.

The sensitivity of a hot wire gauge (such as a Pirani gauge) to pressure variations can be shown analytically $$\frac{d\chi}{dp} \sim \left[R + \frac{10k}{A}\right]^{-1}$$

when $\chi$ is fractional change in resistance and

R is $4\sigma\epsilon\tau o$ so that the maximum change in resistance with change in pressure occurs when R and $10k/A$ are both small. R is small when the thermal radiation from the heater is small. It is approximately $4\sigma\epsilon\tau o^3$ where $\epsilon$ is the thermal emissivity of the surface of the heater, $\sigma$ is the Stefan-Boltzmann conversion constant, and $\tau_o$ the room temperature.

The term $10k/A$ is just 10 times the thermal conductance of the heater wire divided by its circumferential area or $$\frac{10\overline{K}a}{pl^2}\left(k = \frac{\overline{K}a}{l}\right)$$

where $\overline{K}$ is the thermal conductivity, $a$ is the cross sectional area, $p$ is the perimeter and $l$ the length of the heater wire.

According to my invention, I secure low thermal emissivity by making the surface of the thermal element of a material having a low thermal emissivity and of small tendency to corrode and secure a large effective perimeter by securing fins in good thermal contact with the heater wire.

It is accordingly an object of my invention to provide a pressure gauge having a high sensitivity.

It is a further object of my invention to provide a hot wire element, which element has a highly effective surface area.

It is a further object of my invention to provide a hot wire element having low thermal emissivity.

Other objects and advantages of my invention will be apparent from the following specification taken in conjunction with the accompanying drawing, in which Figure 1 is a schematic illustration of a Pirani gauge embodying my invention; and Fig. 2 is a sectional view showing an improved thermal element according to my invention.

A pressure gauge, according to my invention, is of the bridge or Pirani (resistance) type in which the variation in resistance of a hot wire element is noted by means of the balancing bridge system. A plurality of resistors 1a—1b—1c, and 1d, usually four in number, are provided in a bridge relation with a suitable meter 2 across two points of the bridge to measure the unbalanced current in the bridge and potential is supplied in the opposite corners of the bridge for supplying operating current thereto.

At least one of the resistance elements 1d is of the hot wire type and is enclosed in a chamber 3 which is open to the pressure to be measured. Preferably, at least one other of the resistance elements 1c is of a similar type and is enclosed in a highly evacuated chamber 4 so that variations in room temperature do not affect the reading of the instrument measuring the change in resistance of the hot wire element 1d exposed to the pressure to be measured.

In order to increase the sensitivity of the hot wire element 1d exposed to the pressure being measured, I have provided suitable members 5 of large surface area, such as fins, which are spot welded or otherwise secured to the resistance wire 6 of the thermal element. Also, I prefer to construct this resistance wire 6 as a thin ribbon to further increase the effective surface area.

In order to secure low thermal radiation from the hot wire element 6, I have coated the element with a metal having a low thermal emissivity and which is not easily corroded. Gold and silver have been found particularly suitable for this coating and it is known that a gold plating on platinum wire is generally advantageous as a hot wire element.

In the operation of the pressure measuring device, according to my invention, potential is applied to the bridge from a suitable source such as a battery 11 and the hot wire elements 6 are heated to a suitable temperature. Preferably, a relatively low temperature is utilized to secure highest sensitivity of the device. At least one of the hot wire elements 6 is then exposed to the pressure to be measured and the molecules of the gas entering the measuring chamber 3 come in contact with the surface of the heating element and carry away heat energy from this element, thus changing the temperature of the element, which change in temperature varies the resistance of the element and causes a change or unbalance in the current in the bridge so that a measurable current flows in the metering device 2 across the bridge. This meter 2 may be directly calibrated to show the pressure being measured. The sensitivity is further increased by the lack of emission of thermal energy from the hot wire surface because of the construction of the surface of a material having a low emissivity, thus rendering the gauge less responsive to external conditions and highly responsive to the carrying away of energy by the molecules of gas being measured.

The effective surface area, or perimeter, which is secured by the addition of the fins 5, greatly increases the contact area with the molecules without materially changing the normal resistance of the element 6. This lack of interference by radiation and the high rates of contact with the gas molecules greatly increases the sensitivity of the element so that pressure gauges of the variable resistance or bridge type may be utilized to measure the pressure in commercial devices, such as vapor electric devices and other low pressure or vacuum devices.

Although for purposes of illustration I have shown and described a specific embodiment of my invention, it will be apparent that changes and modifications can be made therein without departing from the true spirit of my invention and the scope of the appended claims.

I claim as my invention:

1. In a pressure measuring device having a resistance element exposed to the pressure to be measured, an improved resistance element comprising an elongated resistance body, a plurality of substantially fin-like elements secured to said body to increase the surface area without materially changing the resistance characteristic thereof, at least the surface of said resistance element being constructed of gold.

2. In a resistance network device for measuring gaseous pressure and having a resistance element exposed to the gas whose pressure is to be measured, an improved resistance element comprising an elongated resistance element, said resistance element being shaped to provide a high ratio of exposed surface area to cross section area, a plurality of spaced apart fins secured to said resistance element for materially increasing the surface area without materially changing the resistance thereof, and a coating of a substantially non-corroding metal of low thermal emissivity on said resistance element including said fins.

3. In a bridge type measuring network, a hot wire resistance element comprising a flattened wire-like member, a plurality of metallic fin-like bodies secured to said wire-like member for increasing the surface area thereof, and a coating of a metal of low thermal emissivity on said member and said bodies.

GERELD L. TAWNEY.